United States Patent [19]

Shinohara

[11] Patent Number: 4,635,257
[45] Date of Patent: Jan. 6, 1987

[54] FAIL SAFE CIRCUIT FOR MULTI-SIGNAL TRANSMISSION SYSTEM

[75] Inventor: Toshio Shinohara, Toyota, Japan

[73] Assignee: Toyota Jidosha Kabushiki Kaisha, Toyota, Japan

[21] Appl. No.: 641,485

[22] Filed: Aug. 16, 1984

[30] Foreign Application Priority Data

Aug. 26, 1983 [JP] Japan ................... 58-156163

[51] Int. Cl.⁴ ............................................. G06F 11/10
[52] U.S. Cl. ....................................... 371/12; 371/67; 371/68
[58] Field of Search ................ 371/12, 22, 32, 33, 371/34, 35, 49, 50, 66, 67; 364/200, 900

[56] References Cited

U.S. PATENT DOCUMENTS

| | | | |
|---|---|---|---|
| 3,483,510 | 12/1969 | Widl | 371/12 |
| 3,795,800 | 3/1974 | Nimmo | 371/12 |
| 3,824,547 | 7/1974 | Green | 371/32 |
| 3,879,577 | 4/1975 | Proger | 371/32 |
| 4,045,661 | 8/1977 | Antoine | 371/12 |
| 4,270,205 | 5/1981 | Deshon | 371/33 |
| 4,377,862 | 3/1983 | Koford | 371/32 |
| 4,393,501 | 7/1983 | Kellogg | 371/33 |
| 4,410,991 | 10/1983 | Lenhart | 371/12 |
| 4,422,171 | 12/1983 | Wortley | 371/32 |

Primary Examiner—Michael R. Fleming
Attorney, Agent, or Firm—Cushman, Darby & Cushman

[57] ABSTRACT

A fail safe circuit is provided in the receiver of a multi-signal transmission system which includes a transmitter and a receiver each of which incorporates a resettable power supply. The fail safe circuit comprises a signal check circuit which detects whether a check bit has been received or not and a power supply reset circuit which, when the check bit is not present, once shuts off and then resets both the power supplies incorporated in the receiver and the transmitter in order to initialize the transmitter and the receiver.

7 Claims, 23 Drawing Figures

F I G. 4
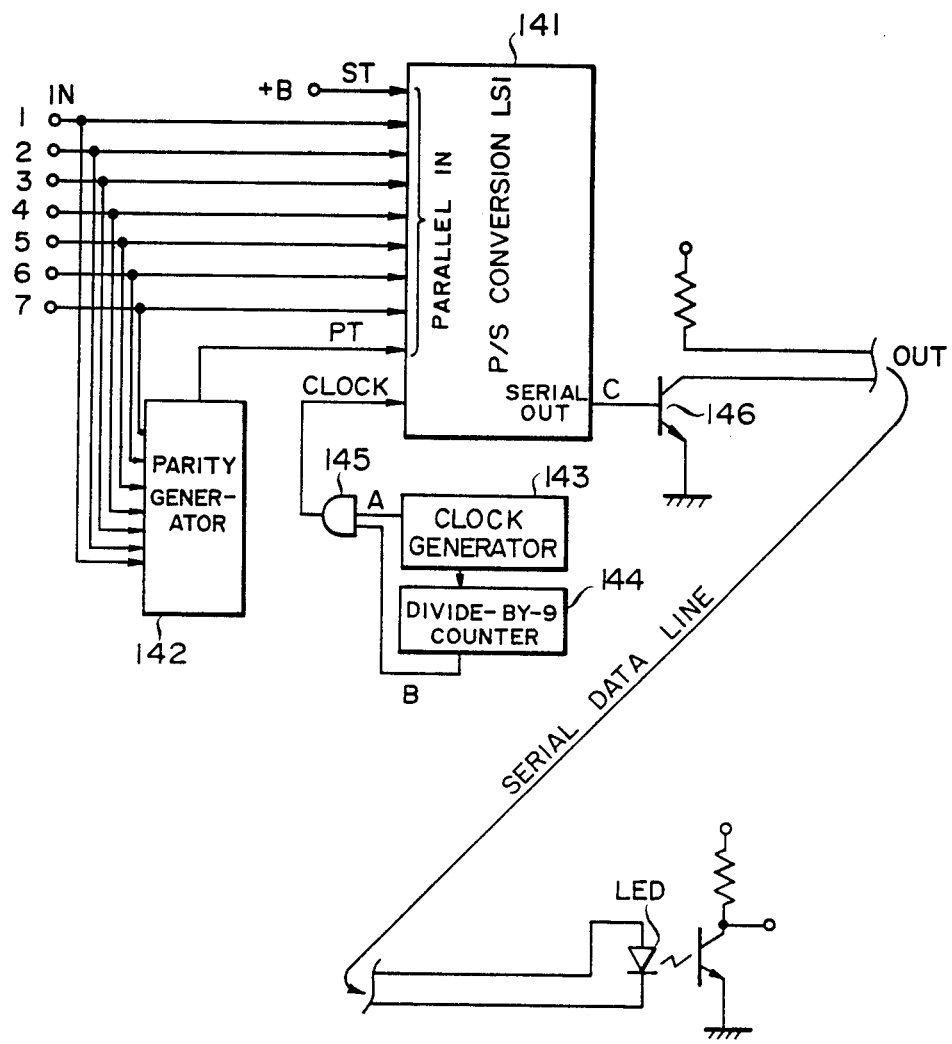

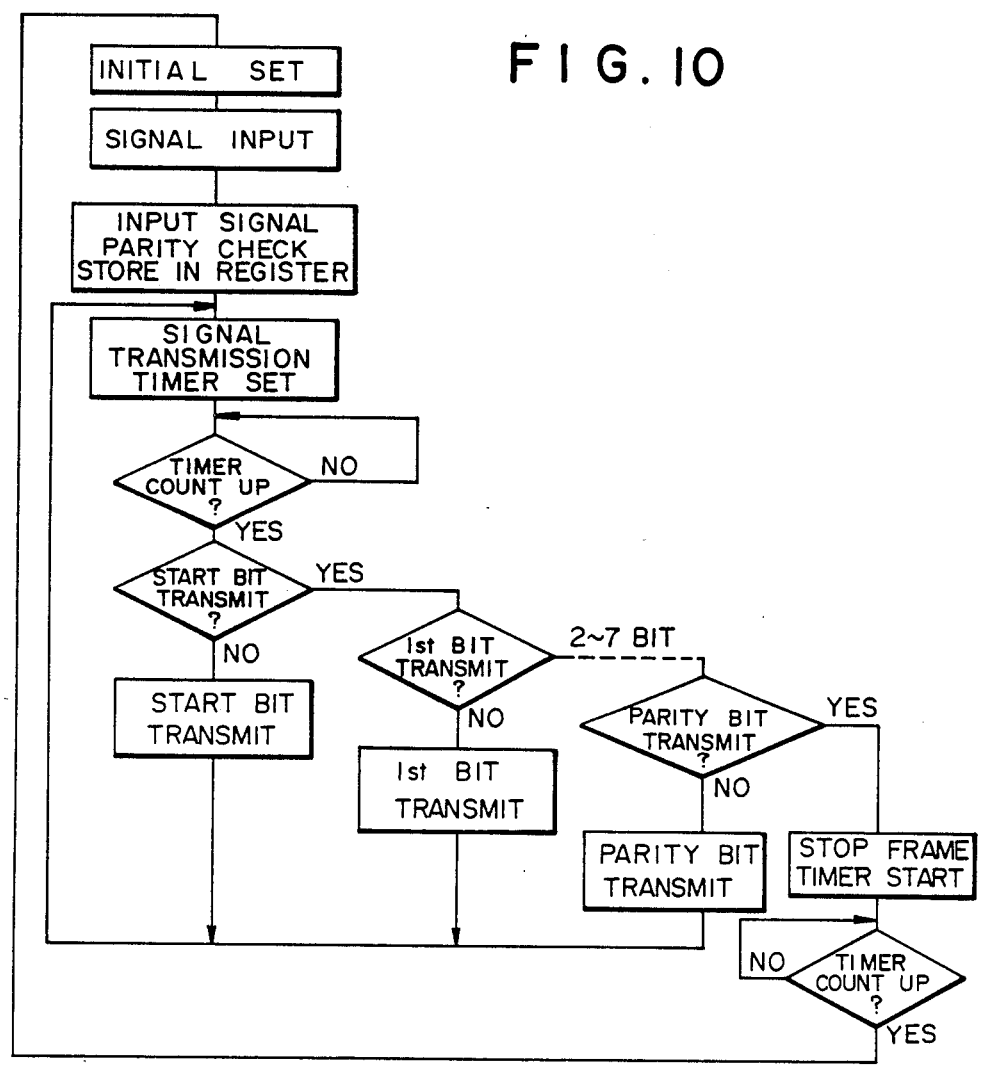
FIG. 10
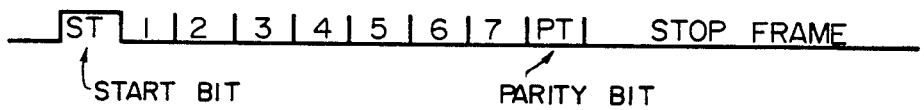

FAIL SAFE CIRCUIT FOR MULTI-SIGNAL TRANSMISSION SYSTEM

BACKGROUND OF THE INVENTION

1. Field of the Invention

The present invention relates to a fail safe circuit for a multi-signal transmission system and, more particularly, to a fail safe circuit for a system which has a transmitter and a receiver and transmits data therebetween.

2. Description of the Prior Art

A digital circuit is known that is composed of a transmitter which conditions an input signal from another system and outputs the same as a digital signal, and a receiver which further conditions the digital signal and outputs the same to, for example, a display unit. This type of digital circuit is arranged such that when the power supply is put on, devices such as flip-flops are reset so as to be initialized. This digital circuit, however, has the disadvantage that if any one of the circuits thereof malfunctions after the starting of an operation, the circuit cannot be returned to its normal state.

SUMMARY OF THE INVENTION

Accordingly, it is a primary object of the present invention to provide a fail safe circuit which is arranged such that, even in the case where, for example, a signal cannot pass through a transmission line or either a transmitter or a receiver malfunctions in a multi-signal transmission system, all the circuits in the system are returned to their normal states.

The above-described object of the present invention is attained as follows: In a multi-signal transmission system including a transmitter which transmits digital signals including a check bit and has data therein initialized when a power supply circuit incorporated therein is reset and a receiver which receives the digital signals and has data therein initialized when a power supply circuit incorporated therein is reset, a fail safe circuit is provided in the receiver, the fail safe circuit comprising: a signal check circuit which detects whether or not the check bit has been received by the receiver; and a power supply reset circuit which, when the check bit is not detected, once shuts off and then resets the power supply circuit in the receiver and that in the transmitter. When the check bit is not detected, the respective power supply circuits in the receiver and the transmitter are once shut off and then reset by a signal from the fail safe circuit. As a result, all the circuit portions are initialized and then returned to their normal states.

BRIEF DESCRIPTION OF THE DRAWINGS

The novel features of the present invention, both as to its organization and method of operation, as well as advantages thereof, will be more readily understood from the following description, when read in connection with the accompanying drawings, in which similar reference characters designate similar parts throughout the several views, and in which:

FIG. 4 is a block diagram showing one example of a parallel-to-serial converter in the transmitter, together with the input part of the receiver of the multi-signal transmission system;

FIG. 10 is a flow chart showing the transmitting operation of the parallel-to-serial converter shown in FIG. 9, together with the signal waveform therein;

DESCRIPTION OF THE PREFERRED EMBODIMENTS

Figure 1:
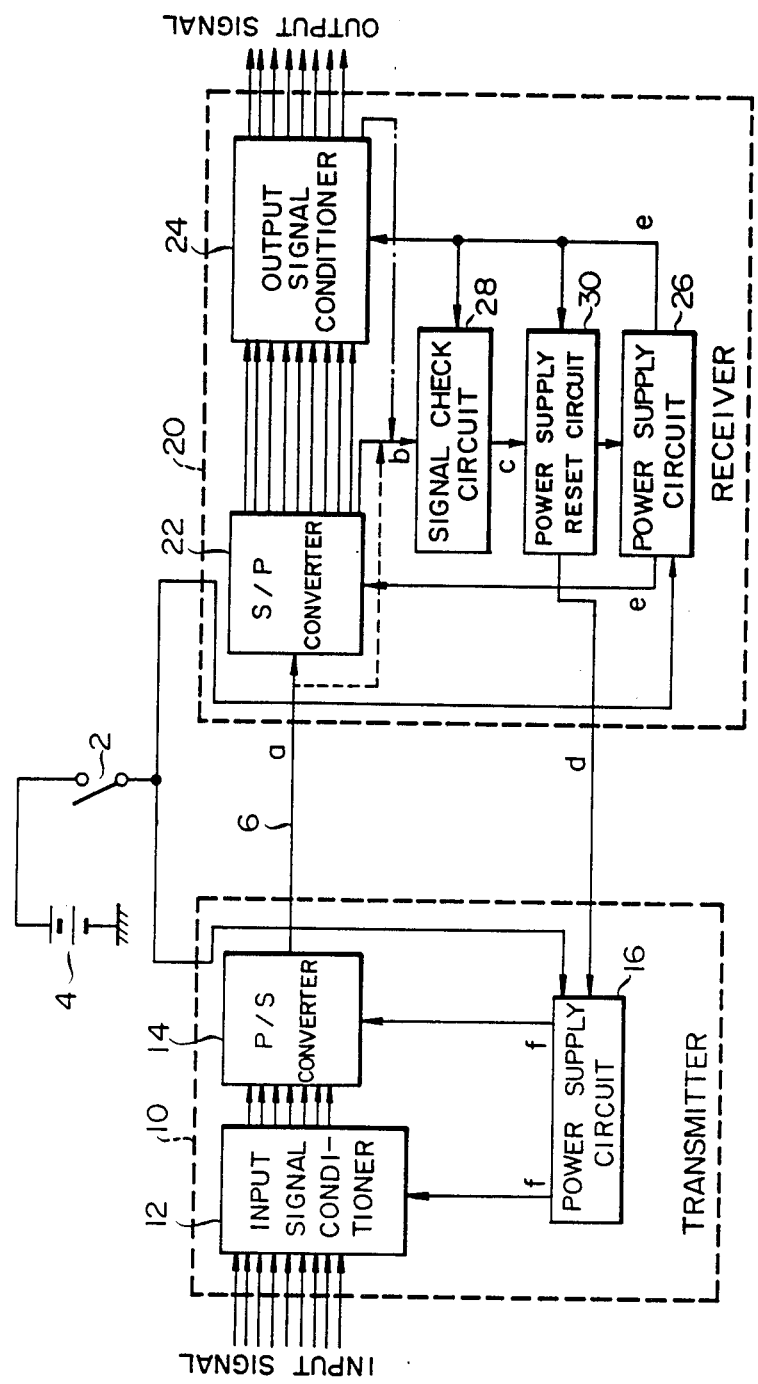
FIG. 1 is a whole schematic diagram of a multi-signal transmission system provided with a fail safe circuit in accordance with the present invention.

Turning now to FIG. 1, there will be seen a whole schematic diagram of one embodiment of the present invention in which the invention is applied to a multi-signal transmission system for a vehicle.

A transmitter 10 includes: an input signal conditioner 12 which controls the amplitude and level of each of the input signals; a parallel-to-serial (P/S) converter 14 which converts the parallel signals output from the input signal conditioner 12 into a serial signal; and a power supply circuit 16. The power supply circuit 16 is connected to car batteries 4 through an ignition switch 2. The power supply circuit 16 supplies stable electric power to the input signal conditioner 12 and the P/S converter 14. The P/S converter 14 is connected to a serial-to-parallel (S/P) converter 22 in a receiver 20, described hereinunder, through a serial signal transmission line 6.

The receiver 20 includes: the S/P converter 22 which converts the serial signal to parallel signals; an output signal conditioner 24 which conditions the parallel signals from the S/P converter 22 and outputs the conditioned output signals; a power supply circuit 26 which is connected to the car batteries 4 through the ignition switch 2; a signal check circuit 28; and a power supply reset circuit 30. The power supply circuit 26 supplies stable electric power to the S/P converter 22, the output signal conditioner 24, the signal check circuit 28, and the power supply reset circuit 30. The input terminal of the signal check circuit 28 is connected to one of the output terminals of the S/P converter 22. On the other hand, the output terminal of the signal check circuit 28 is connected to the power supply reset circuit 30. The signal check circuit 28 outputs a high-level signal having a certain time width when a specific bit in the serial signal which is shared as a check bit is not input thereto. The power supply reset circuit 30 is connected to both the power supply circuits 16 and 26. The circuit 30 outputs a high-level signal having a certain time width when the output signal from the above-described signal check circuit 28 rises, in order to stop the power supply from the power supply circuits 16, 26 during a period of time corresponding to the time width.

Figure 2:
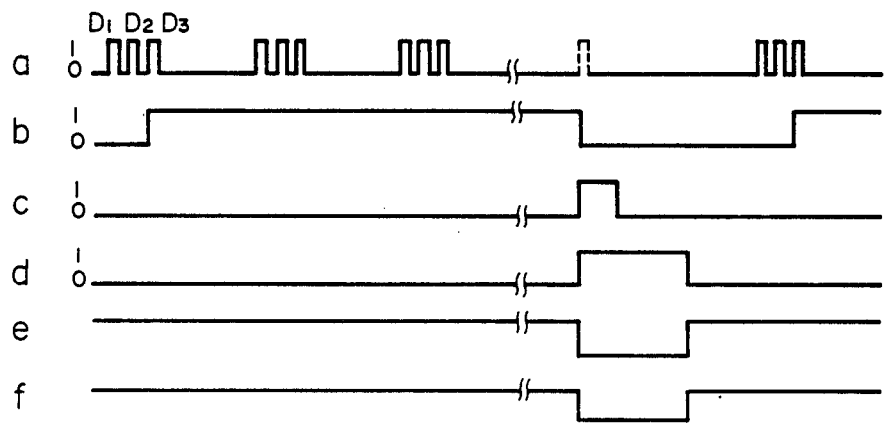
FIGS. 2a–2f is a time chart schematically showing one example of the signal waveforms at various portions of the multi-signal transmission system shown in FIG. 1.

An outline of the operation of the system shown in FIG. 1 will be given hereinunder with reference to the time chart shown in FIG. 2. It is assumed that a serial signal having bits $D_1$ to $D_3$ is transmitted through the serial signal transmission line 6, the bit $D_3$ serving as a check bit, or indicia of failure. The S/P converter 22 converts a serial signal a into parallel signals, and outputs a parallel signal b corresponding to the bit $D_3$ to the signal check circuit 28. In the case where the bit $D_3$ is not received due to some trouble and consequently the parallel signal b falls, a high-level signal c with a certain time width is output from the signal check circuit 28. When the signal c rises, the power supply reset circuit 30 outputs to the power supply circuits 16 and 26 a reset signal d which remains at a high level for a period of time corresponding to a certain time width from the moment when the signal c rises. The power supply circuits 16 and 26 stop the power supply when the reset signal d rises and resume the power supply when the reset signal d falls, as shown by lines e and f in the time chart. As a result, data in the transmitter and the receiver are initialized when the power supply is resumed.

It is to be noted that although in the above-described embodiment description has been made of one example in which the input terminal of the signal check circuit 28 is connected to one of the output terminals of the S/P converter 22, the present invention is not limited to the above-described arrangement. It is also possible to detect the check bit by connecting the input terminal of the signal check circuit 28 to the signal transmission line 6 as shown by the dotted line in FIG. 1 or connecting the input terminal of the circuit 28 to one of the output terminals of the output signal conditioner 24 as shown by the dot-and-dash line in FIG. 1.

Some practical examples of the circuit blocks will be shown hereinunder.

Figure 3:
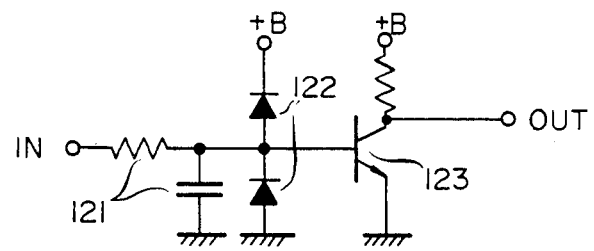
FIG. 3 is a circuit diagram showing in more detail one example of an input signal conditioner in the transmitter of the multi-signal transmission system.

FIG. 3 is a circuit diagram of a 1-bit portion of the input signal conditioner 12 in the transmitter 10. The input signal conditioner 12 is composed of an RC low-pass filter 121, a diode limiter 122 and a transistor amplifier 123. The RC low-pass filter 121 is provided in order to eliminate any high-frequency noise which is output from an engine, etc. The diode limiter 122 limits the amplitude of any excessive input to a predetermined level.

FIG. 4 is a block diagram showing one example of the P/S converter 14 in the transmitter 10, together with the input part of the receiver 20. The P/S converter 14 includes a P/S conversion LSI 141, a parity generator 142, a clock generator 143, a divide-by-9 counter 144, an AND circuit 145, and an output transistor 146. The notations ST and PT on the left-hand side of the LSI 141 respectively denote a start bit and a parity bit. The output of the clock generator 143 and that of the divide-by-9 counter 144 are input to the clock terminal of the LSI 141 through the AND circuit 145. Accordingly, one machine cycle of this system is completed with nine timing pulses. Incidentally, the input part of the receiver 20 shown in the bottom right hand portion of FIG. 4 consists of a light-emitting diode (LED) and a photo transistor.

Figure 5:
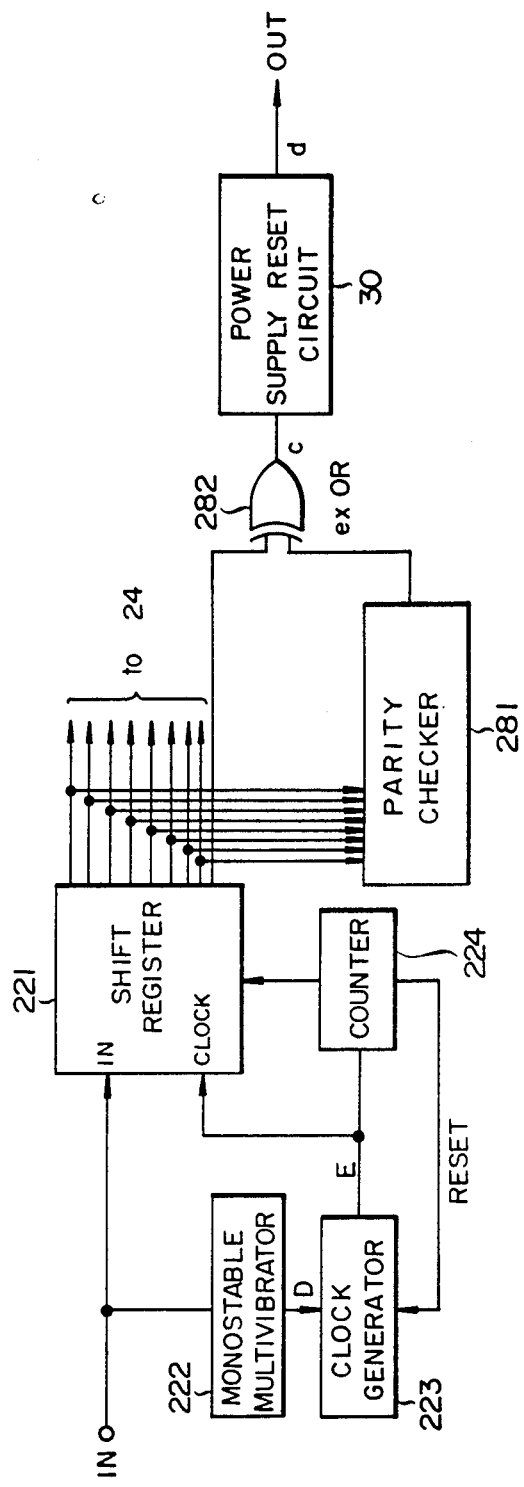
FIG. 5 is a block diagram showing one example of the arrangement of a serial-to-parallel converter, a signal check circuit, and a power supply reset circuit in the receiver.

FIG. 5 is a block diagram showing the S/P converter 22, the signal check circuit 28 and the power supply reset circuit 30 in the receiver 20. The S/P converter 22 is composed of a parallel out shift register 221, a monostable multivibrator 222, a clock generator 223 and a counter 224. The signal check circuit 28 is composed of a parity checker 281 and an exclusive-OR circuit 282. The power supply reset circuit 30 is constituted by a monostable multivibrator. The exclusive-OR circuit 282 detects the occurrence of a trouble from the fact that either one of its input pins fails to receive a signal, and outputs a pulse which actuates the power supply reset circuit 30.

Figure 6:
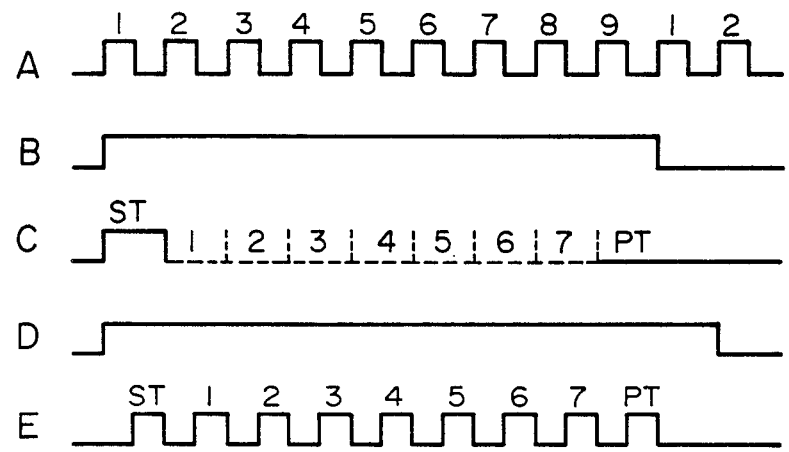
FIGS. 6a–6e is a time chart showing one example of each of the signal waveforms at various portions of the circuits shown in FIGS. 4 and 5.

FIG. 6 is a time chart showing one example of the signal waveforms at A to E points in the circuits shown in FIGS. 4 and 5.

Figure 7:
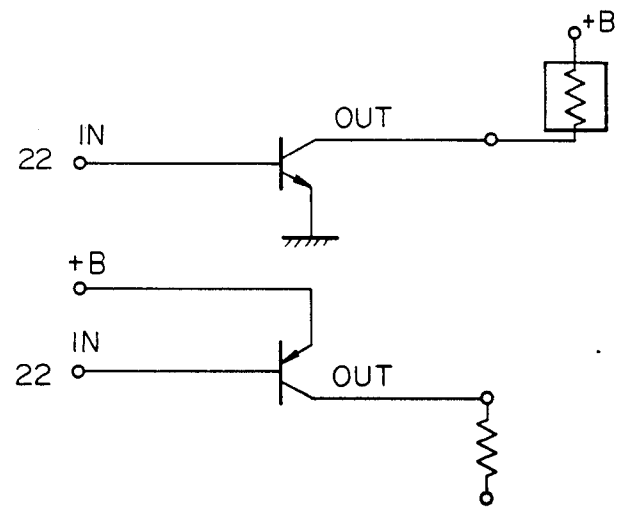
FIG. 7 is a circuit diagram showing two examples of an output signal conditioner in the receiver.

FIG. 7 is a circuit diagram showing two examples of the output signal conditioner 24. The examples are selectively employed according to whether the next stage of the system is operated in the positive logic mode or the negative logic mode.

Figure 8:
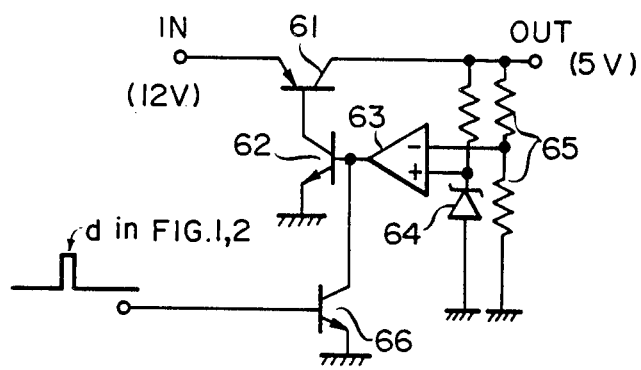
FIG. 8 is a circuit diagram showing one example of the power supply circuits which are provided in the transmitter and the receiver.

FIG. 8 is a circuit diagram showing one example of the respective power supply circuits 16, 26 in the transmitter 10 and the receiver 20. The power supply circuit includes a series regulation transistor 61, a control transistor 62, an error amplifier 63, a voltage-reference diode 64, an output voltage divider 65, and a reset transistor 66. The parts 61 to 65 in combination constitute a constant voltage series regulator. When a reset signal from the power supply reset circuit 30 is applied to the base of the transistor 66, the transistor 66 conducts and places the collector thereof at a low level. As a result, the control transistor 62 and the series regulation transistor 61 are both turned off, thus causing the power supply to be stopped. When the reset pulse disappears, the voltage regulator resumes the power supply. Thus, the data in the transmitter and the receiver are initialized, so that the system as a whole is returned to its normal state.

Figure 9:
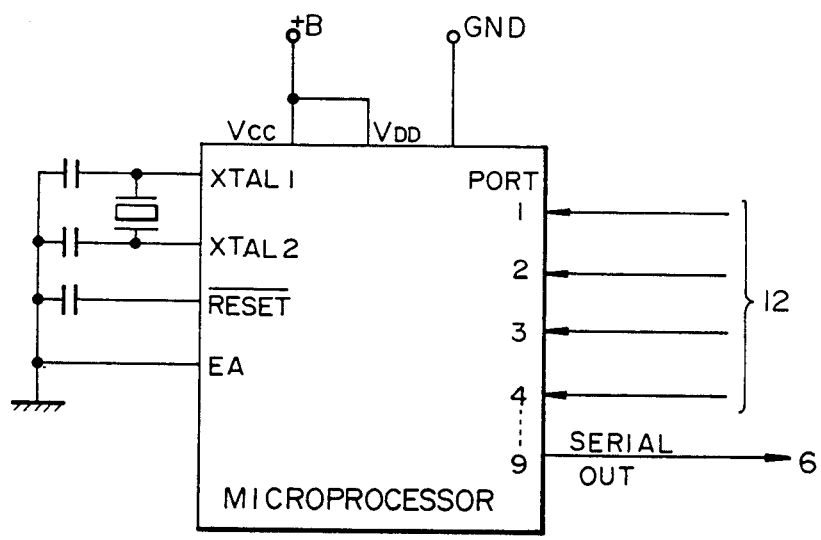
FIG. 9 is a block diagram showing one example of the parallel-to-serial converter of the transmitter in which the converter is constituted by a microprocessor.

FIG. 9 shows one example of the P/S converter 14 in the transmitter 10 in which the P/S converter 14 is constituted by a microprocessor. The transmitting operation of the P/S converter 14 is such as that shown in the flow chart of FIG. 10.

Figure 11:
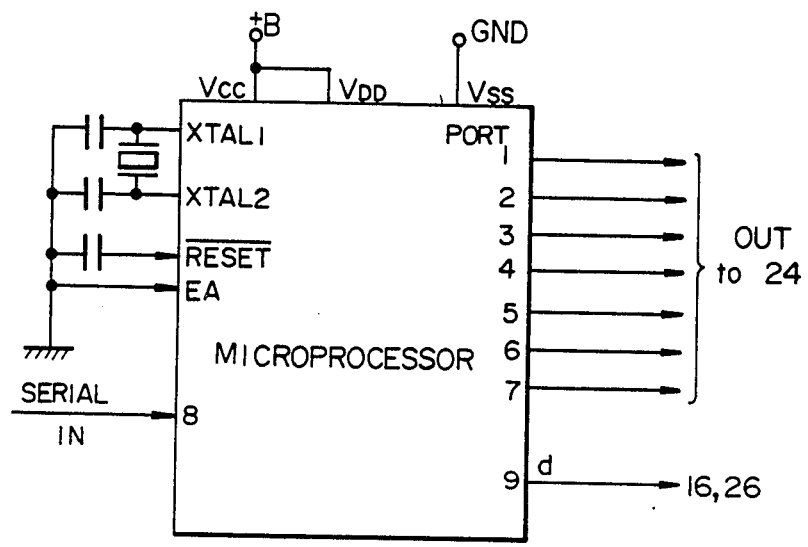
FIG. 11 is a block diagram showing one example of the arrangement of the serial-to-parallel converter, the signal check circuit and the power supply reset circuit in the receiver in which these circuits are constituted by one microprocessor.
Figure 13:
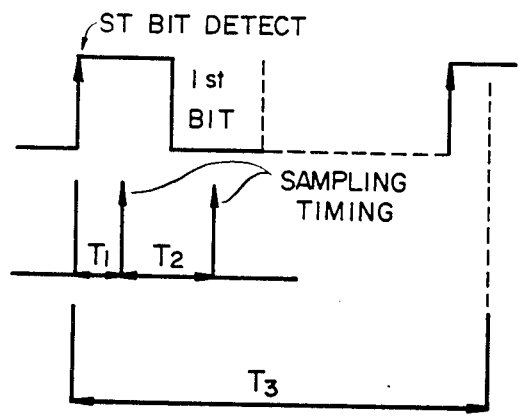
FIG. 13 is a time chart showing the relationship between the timer intervals respectively set on timers employed in relation to the flow chart shown in FIG. 12.
Figure 12:
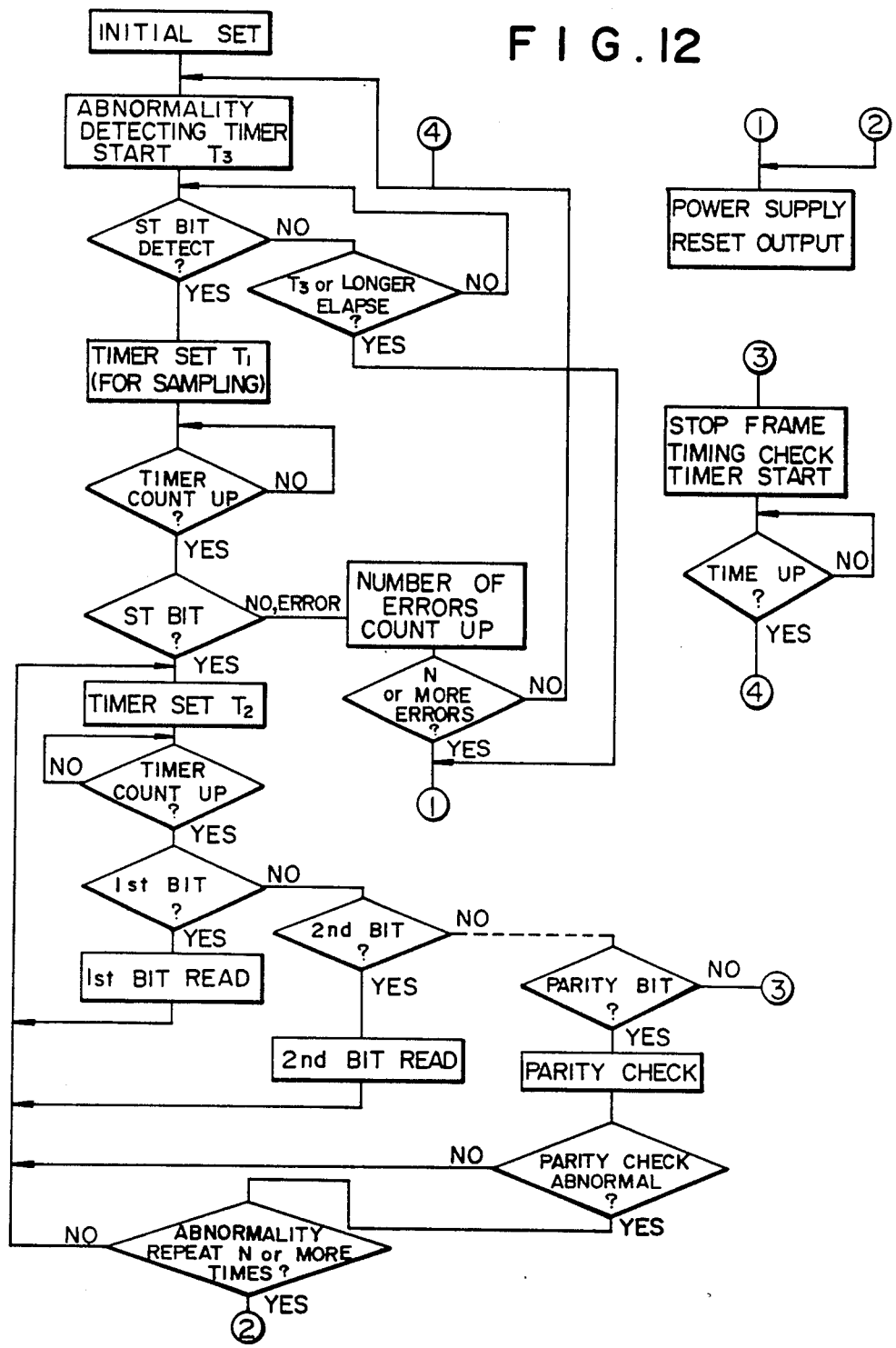
FIG. 12 is a flow chart showing the signal processing effected by the microprocessor shown in FIG. 11.

FIG. 11 shows one example of the arrangement of a part of the receiver 20 in which the S/P converter 22, the signal check circuit 28 and the power supply reset circuit 30 are constituted by one microprocessor. The signal processing by the microprocessor is effected as shown in the flow chart of FIG. 12. In this case, it is important that the time interval $T_3$ should be set such as to be longer than the time from one ST bit detection timing to a subsequent ST bit detection timing as shown in FIG. 13.

In the embodiment shown in FIG. 1, having the above-described arrangement and operation, when the parity bit is not present, the respective power supply circuits in the transmitter and the receiver once turn off and then resume the power supply; therefore, the data in the transmitter and the receiver are initialized, and consequently, the operation carried out thereafter is smoothly executed.

Figure 14:
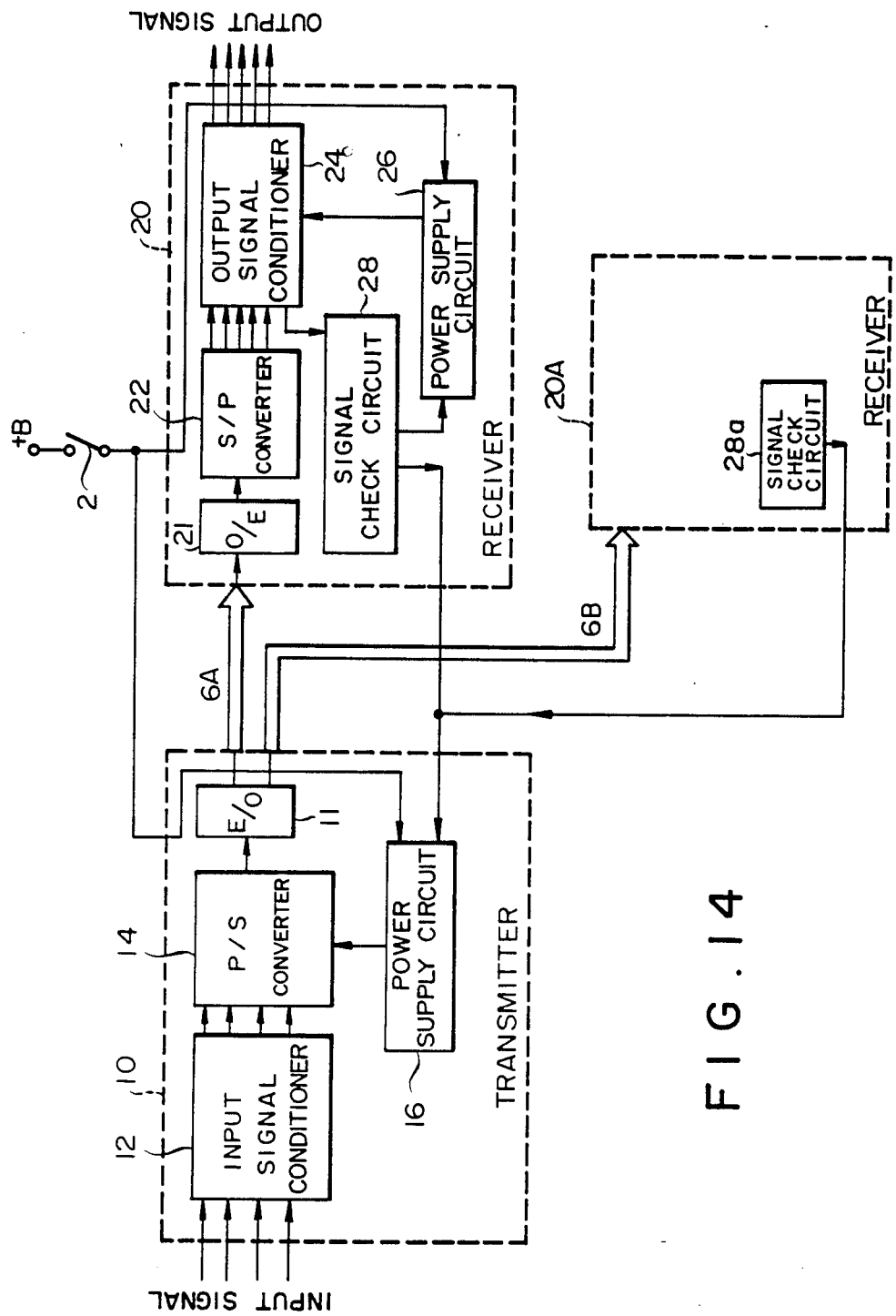
FIG. 14 is a whole schematic diagram of a multi-signal transmission system which includes a plurality of receivers each provided with the fail safe circuit in accordance with the present invention.

Moreover, another embodiment of the present invention will be described with reference to FIG. 14.

The second embodiment is a multi-signal transmission system which is composed of one transmitter and two receivers 20, 20A. Description of the parts in FIG. 14 which are denoted by the same reference numerals as those in FIGS. 1 to 13 is omitted.

The transmitter 10 and the receivers 20, 20A are connected through transmission lines 6A and 6B each constituted by an optical fiber. The transmitter 10 is provided with an electric-to-optical (E/O) signal converter 11 which converts an electric signal into an optical signal, while the receiver 20 is provided with an O/E signal converter 21 which converts the optical signal into an electric signal. Further, in the receiver 20, the input terminal of the signal check circuit 28 is connected to one of the output terminals of the output signal conditioner 24. The output of the signal check circuit 28a in the receiver 20A is applied to the power supply circuit 26a (not shown) and is also applied to the power supply circuit 16 in the transmitter 10. In this embodiment, similarly to the embodiment shown in FIG. 1, the power supply circuit in the transmitter and that in the receiver which detects no parity bit are reset in order to initialize the data in the transmitter and the receiver. Thus, it is possible to return the circuits to their normal states. The other receiver remaining normal is only required to await subsequent data from the transmitter. It is to be noted that it will be apparent to persons skilled in the art that the number of the receivers may be three or more. In addition, the check bit may be detected from the output of the S/P converter.

While only a limited number of embodiments of the invention have been described in the foregoing description, it is possible to produce still other embodiments without departing from the spirit and scope of the present invention.

What is claimed is:

1. A fail safe transmission system, comprising:
a transmitter unit including:
(a) means for transmitting a signal;
(b) means for controlling said transmitting;
(c) means for supplying power to said transmitter unit, said supplying means being remotely controllable to have an on state where power is supplied and an off state where power is not supplied; and
(d) power-up reset means for initially resetting said transmitter unit when power is applied thereto; and
a receiver unit, coupled to said transmitter unit, including:
(a) means for a receiving a signal from said transmitter unit;
(b) means for determining whether a predetermined indicia of failure is present in said receiving signal;
(c) means for supplying power to said receiver unit, having an on state where power is supplied and an off state where power is not supplied;
(d) power-up reset means for initially resetting said receiver unit when power is applied thereto; and
(e) power supply reset means, responsive to said determining means, for controlling said supplying means of both of said receiver unit and of said transmitter unit to said off state for a predetermined time period when a predetermined number of said indicia of failure are detected by said determining means, allowing both of said transmitter and receiver to be reset on power up.

2. A system as in claim 1 wherein said system is used in an automobile.

3. A system according to claim 2, wherein there are a plurality of said receivers.

4. A system according to claim 2, wherein each power supplying means is constituted by a constant voltage regulator which includes a regulation transistor, a control transistor therefor and an output voltage error amplifier, and wherein said power supply reset means blocks the application of the output of said error amplifier to said control transistor, thereby to shut off said power supply circuit.

5. A system according to claim 2, wherein said receiver includes an S/P, or serial to parallel converter, and said determining means includes a parity checker and an exlusive-OR circuit to which are applied a parity bit from said S/P converter and the output of said parity checker, said determining means being adapted to output a pulse for exciting said power supply reset means when either one of the inputs of said exclusive-OR circuit is not present.

6. A system according to claim 2, wherein said receiver includes an S/P, or serial to parallel converter, and said S/P converter, said signal check circuit, and said power supply reset circuit are constituted by a microprocessor.

7. A fail safe circuit for the multi-signal transmission system according to claim 3, wherein said transmitter includes an E/O, or electrical to optical converter, and each of said receivers includes an O/E, or optical to electrical converter, and wherein said transmitter and each receiver are connected through an optical fiber.

* * * * *